United States Patent

Lancor, Jr.

[15] 3,650,609
[45] Mar. 21, 1972

[54] SOUND MOTION PICTURE CAMERA

[72] Inventor: Joseph H. Lancor, Jr., Arcadia, Calif.
[73] Assignee: Bell & Howell Company, Chicago, Ill.
[22] Filed: Nov. 3, 1969
[21] Appl. No.: 873,330

[52] U.S. Cl. ..................................352/17, 352/25, 352/31
[51] Int. Cl. .......................................................G03b 31/04
[58] Field of Search......................352/17, 18, 12, 13, 15, 24, 352/25, 31

[56] References Cited

UNITED STATES PATENTS

| | | | |
|---|---|---|---|
| 2,725,785 | 12/1955 | Templin | 352/24 |
| 2,932,235 | 4/1960 | Ochiai | 352/17 |
| 2,975,672 | 3/1961 | Shields | 352/17 X |
| 3,243,250 | 3/1966 | Keznickl | 352/12 X |
| 3,259,010 | 7/1966 | Mindell | 352/17 X |

Primary Examiner—Louis R. Prince
Assistant Examiner—Joseph W. Roskos
Attorney—Luc P. Benoit

[57] ABSTRACT

A motion picture camera comprises a sound recorder and a control mechanism. The control mechanism becomes operative when a termination of a picture taking and sound recording operation is initiated during the taking of an image frame. In that case the control mechanism defers termination of the picture taking and sound recording operation pending completion of the taking of the particular image frame. The operation of this control mechanism improves the attainable image-sound synchronism.

From another aspect of the disclosure, a mechanism mounted in the camera housing jointly actuates and jointly releases the motion picture taking means and the sound recording means in response to an actuation and to a release, respectively, of a member movably mounted in the camera housing to be manually actuable from the outside thereof.

15 Claims, 4 Drawing Figures

INVENTOR.
JOSEPH H. LANCOR, JR
BY
ATTORNEY

Patented March 21, 1972  3,650,609

INVENTOR.
JOSEPH H. LANCOR, JR.
BY
Marc P. Benoit
ATTORNEY 3,650,609

SOUND MOTION PICTURE CAMERA

CROSS-REFERENCE TO RELATED APPLICATIONS

Aspects of the present application are related to subject matters of the following patent applications which herewith are incorporated by reference herein, and which are assigned to the assignee of the present application:

Ser. No. 684,254, Audio-visual Recording and Display Methods and Apparatus, filed Nov. 20, 1967, by Joseph H. Lancor, Jr.;

Ser. No. 684,253, Control Information Recording and Sensing Methods and Apparatus, filed Nov. 20, 1967, by Lewis B. Browder;

Ser. No. 735,731, Sound Recorder Control, filed June 6, 1968, by Robert S. John.

BACKGROUND OF THE INVENTION

1. Field of the Invention

The subject invention relates to audio-visual systems and, more particularly, to sound motion picture cameras.

2. Description of the Prior Art

The desire to provide motion pictures with sound accompaniment is as old as the motion picture art itself. Since motion picture viewers are accustomed from their daily experience to perceive their environment both visually and aurally, it was soon recognized that the impression of live performances could only be attained upon a synchronous recording and reproduction of the sound accompaniment with the action on the film.

The above mentioned patent applications disclose audio-visual systems in which sound accompaniments are recorded on a medium which is separate from the picture film. These systems are highly advantageous where the cost and intricacies of optical sound recording equipment would render sound recording by way of optical track on the film prohibitive, or where the stiffness or low speed of the motion picture film does not permit satisfactory sound reproduction by way of magnetic track on the film.

While the massive and widespread acceptance of these systems attests to their utility and progressive nature, there still exists a need for advanced alternative solutions of the type presently to be disclosed.

SUMMARY OF THE INVENTION

From one aspect thereof, the subject invention provides a motion picture camera comprising motion picture taking means having a quiescent state, and having an active state for taking motion pictures in the form of motion picture frames, and sound recording means having a quiescent state, and having an active state for recording sound accompaniments for the motion pictures. This motion picture camera further includes actuating means operatively associated with the motion picture taking means and the sound recording means for selectively actuating the motion picture taking means and the sound recording means to their active states, and for selectively initiating a release of the motion picture taking means and the sound recording means to their quiescent states.

The motion picture camera under discussion moreover includes means operatively associated with the actuating means for deferring a release of the motion picture taking means and the sound recording means to their quiescent states pending completion of the taking of a motion picture frame by said motion picture taking means.

In this manner a sound recording operation at the end of a motion picture taking sequence does not get stopped until the taking of the last frame of that sequence has been completed. This, of course, is highly conducive to the maintenance of proper image-sound synchronism without which systems of the subject type are useless.

From another aspect thereof, the subject invention provides a motion picture camera comprising, in combination, a housing, motion picture taking means of the above mentioned type mounted in this housing, and sound recording means of the above mentioned type mounted in this housing. The motion picture taking means include a first selectively energizable electric drive motor, and the sound recording means include a second selectively energizable electric drive motor mechanically isolated from the first electric drive motor. This camera further includes a member movably mounted in the housing to be manually actuable from outside of the housing, and a mechanism mounted in the housing and operatively associated with the member just defined and with the motion picture taking means and sound recording means for jointly actuating the motion picture taking means and the sound recording means to their active states in response to manual actuation of said member, and for jointly releasing the motion picture taking means and the sound recording means to their quiescent states in response to a release of said member.

Considering this combination of elements, it will be appreciated that the camera just defined permits the synchronous initiation and termination of sound and motion picture sequences upon the actuation and release of a single member which operates a mechanism that is common to both the motion picture taking means and the sound recording equipment.

If desired, the above mentioned deferring means that assure synchronous termination of motion picture and sound sequences may advantageously be incorporated in the latter mechanism.

DESCRIPTION OF PREFERRED EMBODIMENTS

Figure 1:
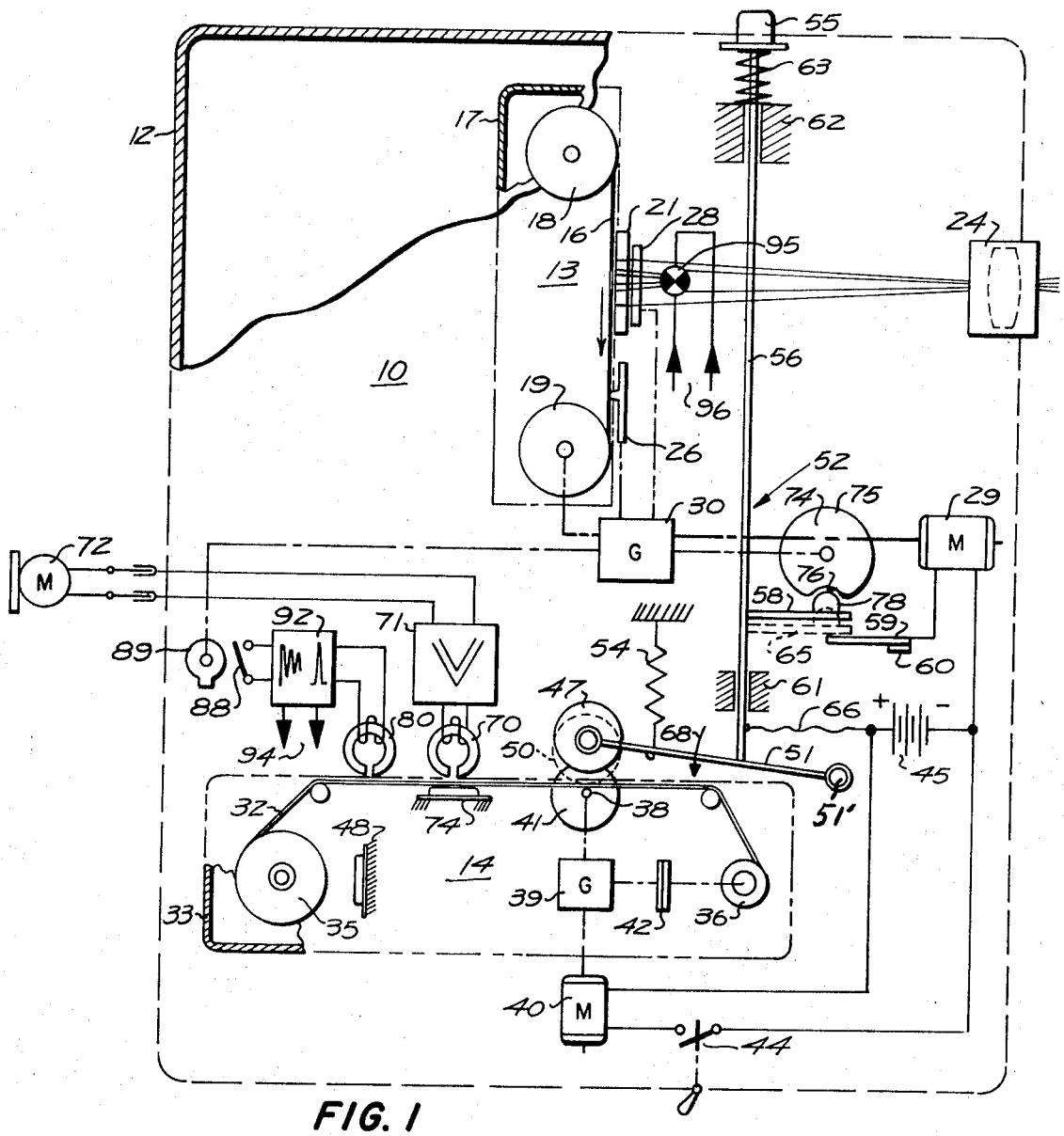
FIG. 1 is a schematic illustration, partially in section, of a motion picture camera in accordance with a preferred embodiment of the invention.

The motion picture camera 10 shown in FIG. 1 has a housing 12 which contains motion picture taking equipment 13 and sound recording equipment 14. A motion picture film 16 is located at the equipment 13 in a removable cartridge 17 which contains a supply reel 18 and a takeup reel 19 for the film 16.

The picture taking equipment 13 has an image gate 21 through which the film 16 is exposed by way of picture frames 22 (see FIG. 2) to images which are projected on the film by a lens system 24. A pulldown 26 intermittently advances the film 16 in a conventional manner, and a shutter 28 obscures the image gate during each film advance to prevent an exposure of the film between successive picture frames.

An electric motor 29 drives the pulldown 26 and the shutter 28 through conventional gearing 30 so that motion pictures are provided on the film 16.

A magnetic sound recording tape 32 is located at the sound recording equipment 14 in a removable cassette 33 which contains a tape supply hub 35 and a tape takeup hub 36. A capstan 38 reaches into the cassette 33 and is driven through gearing 39 by an electric motor 40. A flywheel 41 is coupled to the capstan 38 to improve the quality of the tape drive in a conventional manner. A slip clutch 42 couples the takeup hub 36 to the gearing 39 to provide for a winding of the tape 32 onto that hub.

A manually actuable switch 44 is closed by the operator preparatory to the taking of sound-accompanied motion pictures. Closure of the switch 44 connects the motor 40 for energization to a battery 45. The motor 40 accordingly drives the capstan 38. However, the capstan 38 is positioned such that it does not engage the tape 32 unless a pressure roller 47 holds the tape against the capstan 38. To prevent an unintended tape advance, the tape supply hub 35 is coupled to a friction brake 48 which restrains movement of the tape by action of the gearing 39 on the takeup hub 36 through the friction clutch 42 when the tape 32 is disengaged from the capstan 38.

Accordingly, the sound recording equipment 14 is still in a quiescent state even though the drive motor 40 has been energized. The recording equipment 14 assumes an active state upon movement of the pressure roller 47 to the advanced position indicated by the dotted outline 50. To this end the roller 47 is rotatably mounted on an arm 51 which is pivoted at 51' and which is selectively actuated by a mechanism 52. A spring 54 engages the arm 51 to bias the roller 47 to its solidly illustrated position.

A manually actuable button 55 is movably mounted in the housing 12 so as to be actuable from the outside thereof. The actuating mechanism has a rod 56 connected to the button 55. The rod 56 carries a contact blade 58, while a contact blade 59 is mounted at 60 to be in spaced relationship to the blade 58. Two bearings 61 and 62 permit longitudinal movement of the rod 56, while a spring 63 biases the button 55 in its illustrated position. The mechanism 52 is biased in its illustrated position by the springs 54 and 63. If the rod 56 is slidable in the button 55 as shown by way of alternative example in FIG. 3, then the mechanism 52 is biased in its illustrated position by the spring 54 which acts through the arm 51 on the rod 56.

If the operator decides to take sound-accompanied movies, he first closes the switch 44 which, as mentioned above, results in rotation of the capstan 38 without movement of the tape 32 at that juncture, however. The operator thereupon depresses the button 55 to actuate the mechanism 52 by movement of the rod 56. The resulting movement of the blade 58 to the actuated position illustrated by a dotted outline 65 provides electrical contact between the blades 58 and 59.

Since the battery 45 is connected to the rod 56 through a flexible conductor 66, the following energization circuit is established for the electric drive motor for the motion picture taking equipment 13 in response to a depression of the button 55:

positive terminal of battery 45, conductor 66, rod 56, blade 58, blade 59, motor 29, and negative terminal of battery 45.

Simultaneously the downwardly moving rod 56 actuates the arm 51 in the direction of the arrow 68 until the roller 47 is in its advanced position 50 and presses the tape 32 against the capstan 38. Since the capstan is already at full speed at this moment because of the preceding closure of the switch 44, the tape 32 is advanced with a minimum of delay. The tape drive of the illustrated preferred embodiment accordingly functions as a low-inertia drive.

In consequence, the motion picture taking equipment 13 and sound recording equipment 14 commence operation simultaneously in response to a depression of the button 55. Sound is thereupon recorded on the magnetic tape 32 by a sound recording head 70 which may be energized by conventional sound recorder amplifying equipment 71 driven by a microphone 72. A biased felt pad 74 presses the tape 32 against the recording head 70 for improved recording quality.

A further important feature becomes apparent from the fact that separate electric motors 29 and 40 which are mechanically isolated from each other are provided for driving, respectively, the equipment 13 and the equipment 14. This materially improves the performance of the sound recorder 14 over prior art systems in which one motor was employed to drive the film and the sound tape in the camera, and in which disturbances brought about by the intermittent film advance were reflected in the tape advance.

In this manner, sound accompaniments for the motion pictures taken at 13 are recorded on the tape 32.

To provide for a simultaneous termination of sound accompaniment and corresponding motion picture sequence, the mechanism 52 includes a rotatable cam 74 which has a periphery 75 and a recess 76. The contact blade 58 has a protrusion 78 which rests in the recess 76 and which, upon rotation of the cam 74, rides on the periphery 75.

The cam is driven by the motor 29 through the gearing 30 to execute one revolution from the moment the taking of a picture frame commences to the moment at which the taking of that picture frame has been completed. This frame-synchronous revolution of the cam 74 is readily accomplished by driving the cam from an appropriately dimensioned gear in the gearing 30 between the drive motor 29 and the film advance 26 and shutter 28.

Let us now assume that the equipment 13 and 14 is in the process of taking a sound-accompanied motion picture in response to a preceding depression of the button 55 and that the operator releases the button 55 in order to terminate the taking of the particular motion picture sequence. If the rotating cam 74 at that instant happens to be in its illustrated position, then the protrusion 78 can readily move into the recess 76 and there is no restraint against the breaking of the contact between the blades 58 and 59 and a simultaneous movement of the roller 47 to its solidly illustrated position.

In other words, since the cam recess 76 is in its illustrated position upon completion of the taking of each picture frame, the taking of the motion picture and the recording of its sound accompaniment is permitted to stop without delay when the release of the button 55 by the operator coincides with a positioning of the recess 76 of the cam 74 in registration with the protrusion 78.

However, since the cam 74 is rotating during picture taking, the recess 76 will rarely be in registration with the protrusion 78 when the operator happens to release the button 55. Rather, the protrusion 78 will at that instant ride on the cam periphery 75. Unlike the contact blade 59, which is flexible, the blade 58 is in the form of a rigid arm so that the rod 56 cannot move upwardly as long as the protrusion 78 rides the cam periphery 75.

Since the protrusion 78 rides the cam periphery 75 as long as the taking of a picture frame is in progress, the illustrated cam mechanism effectively defers a release of the motion picture taking equipment 13 and the sound recording apparatus 14 to their quiescent states pending completion of the taking of a motion picture frame (i.e., the taking of the motion picture frame whose taking was in progress when the button 55 was released). Upon that completion, the recess 76 is in registration with protrusion 78 whereby the blade 58 can readily move away from the blade 59 breaking the energization contact for the film drive motor 29, and whereby the roller 47 is released to its solidly illustrated position thereby causing the recording tape to stop at the same instant as the taking of a picture frame is completed.

It will now be recognized that the subject invention greatly enhances the synchronous advance of the sound recording and picture film media. This synchronism may be further enhanced by the use of equipment that will now be described.

Figure 2:
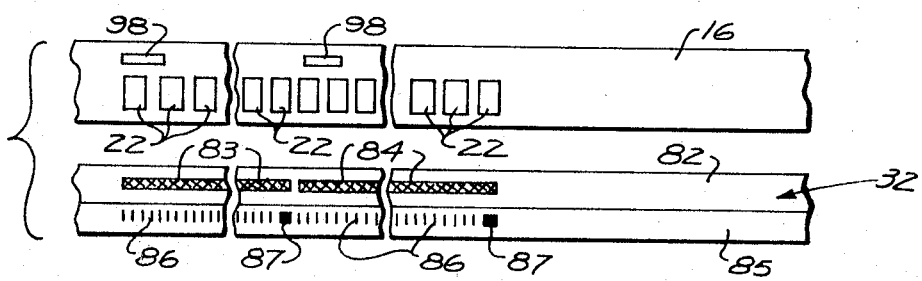
FIG. 2 is a schematic illustration of a motion picture film and sound recording tape on which recordings have been made by the camera of FIG. 1.
Figure 3:
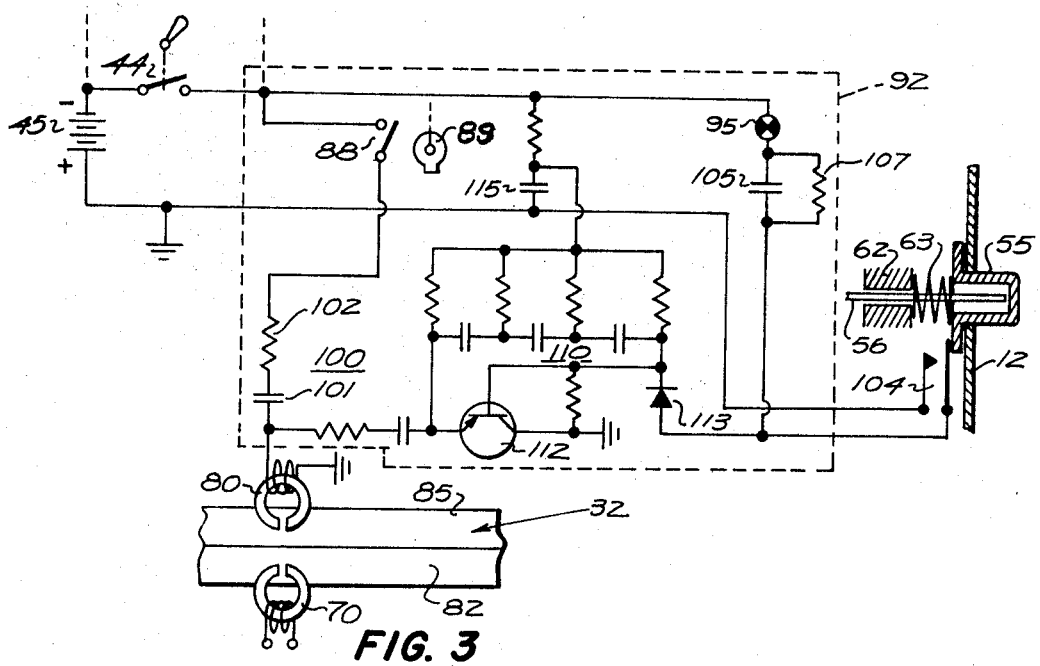
FIG. 3 is a diagram of electronic circuits that may be employed in the camera of FIG. 1.
Figure 4:
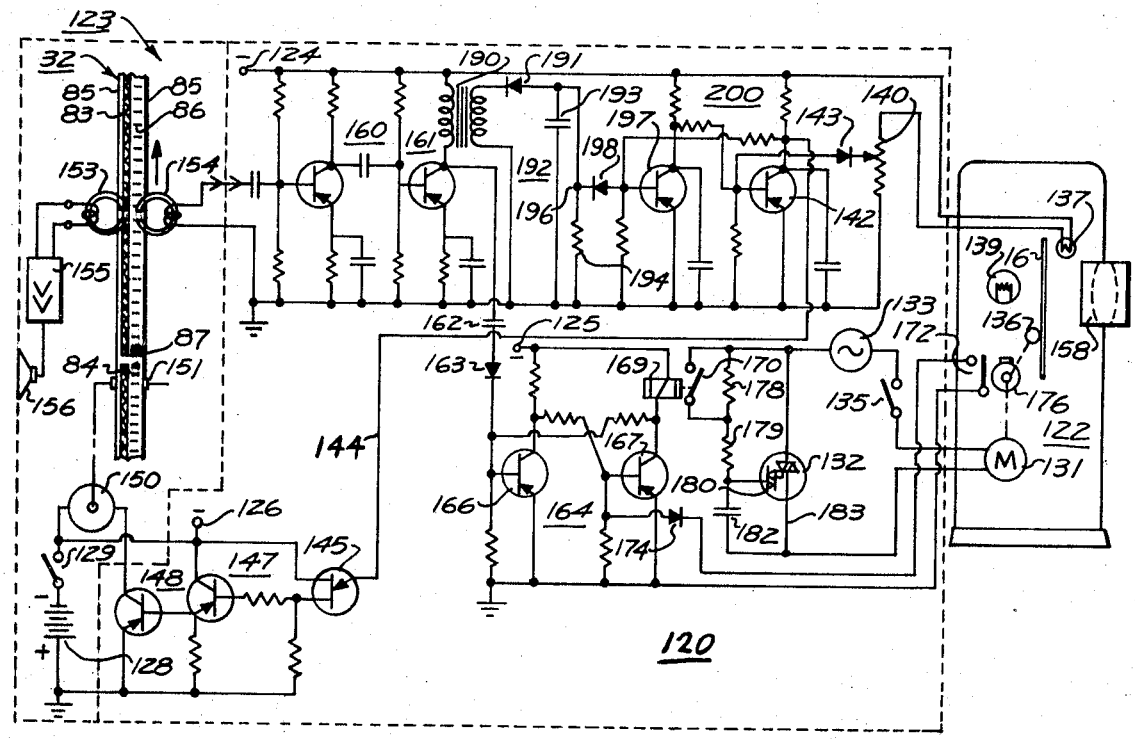
FIG. 4 is a diagram of electronic circuits and related equipment for reproducing the audio-visual recordings produced by the camera of FIG. 1.

According to FIG. 1 the sound recording equipment 14 includes a control signal recording head 80 for recording synchronization information on a track of the magnetic recording tape 32. As seen in FIG. 2 the recording tape 32 may have a sound track 82 for recording sound accompaniments 83 and 84, and a control track 85 for recording synchronization signals 86 and sound sequence termination marks 87. The heads 70 and 80 may either be offset from each other as seen in FIG. 1, or may be adjacent each other as shown in FIGS. 3 and 4, it being understood that the same arrangement is used for recording and playback.

Provision of the synchronization signals 86 is initiated by a switch 88 which is actuated by a cam 89 that is driven by the gearing 30 so as to provide a desired number of synchronization pulses per each picture frame. This number may be smaller than one, but a number of one or more than one may be required for increased accuracy. The actual formation of the synchronization pulses in the signal 86 takes place in the pulse generator 92, an example of which will be described in connection with FIG. 3.

The pulse generator 92 provides also termination signals 87 which are recorded by the head 80 in addition to the synchronization signals 86 and which, as seen in FIG. 2, signify the end of a sound accompaniment pertaining to a particular motion picture sequence.

The pulse generator moreover provides at terminals 94 an electric energy pulse for the momentary energization of a lamp 95 through terminals 96. As indicated in FIG. 2, the lamp 95 briefly exposes the film in response to each energy pulse to provide at the beginning of each motion picture sequence a marking 98 on the film indicating the start of the particular sequence. The function of the start markings 98, as well as that of the termination marks 87, will be described in connection with FIG. 4 which is concerned with the projection of the motion picture sequences and the playback of the sound accompaniments.

At the moment, attention will be directed to FIG. 3 which shows an example of the pulse generator 92 with related equipment. Like or functionally equivalent parts as among FIGS. 1 and 3 are designated by like reference numerals.

According to FIG. 3, closure of the switch 44 not only initiates energization of the tape recorder motor 40 as discussed in connection with FIG. 1, but also connects the pulse generator 92 to the camera battery 45. Actuation of the synchronous switch 88 during operation of the motion picture taking equipment 13 supplies the recording head 80 with synchronization pulses through a pulse shaping circuit 100 schematically indicated as comprising a series-connected capacitor 101 and resistor 102. The head 80 accordingly records the synchronization signal 86 seen in FIG. 2.

When the button 55 is depressed to initiate operation of the camera, a switch 104 is closed to establish the following energization circuit for the film exposure lamp 95:

positive terminal of batter 45, switch 104, capacitor 105, lamp 95, switch 44, and negative terminal of battery 45. The resulting capacitor charging current surge briefly energizes the lamp 95 for a momentary exposure of the film 16 to provide one start mark 98 at a time (see FIG. 2). A resistor 107 is connected across the capacitor 105 to assure a discharge of same prior to a provision of the next starter mark. The impedance of the resistor 107 is high enough to prevent light emission by the lamp 95 after the initial capacitor charging surge.

The pulse generator of FIG. 3 further includes a phase shift oscillator 110 for providing the sound sequence termination marks 87. The oscillator 110 is composed of a transistor 112 and of resistor and capacitor elements connected in a conventional manner as shown.

As long as the switch 104 is closed, the operation of the oscillator 110 is suppressed by a current bias applied through a diode 113. Energy stored in a capacitor 115, however, permits the oscillator 110 to oscillate when the switch 104 is opened in response to a release of the button 55. The resulting oscillation is applied through a pulse shaping filter 117 to the head 80 for a recording of a sound sequence termination mark 87 (see FIG. 2). The button 55 is slidable with respect to the rod 56 so that the termination mark 87 may be recorded prior to a stopping of the tape recorder upon completion of the taking of the last picture frame of the particular motion picture sequence.

FIG. 4 illustrates a control 120, a projector 122, and a tape recorder 123 for a projection of the motion pictures and a playback of the sound accompaniments recorded i the camera of FIG. 1.

After photochemical development, the film 16 is inserted in the projector 122. The developed film may be contained in the same cartridge that housed the film in the camera of FIG. 1. Similarly, the tape 32 is preferably retained in the cassette 33 (see FIG. 1) and is inserted in the playback apparatus while contained in such cassette.

The control 120 has terminals 124 and 125 which are connected to a terminal 126 so that the circuits of the control are energized from a battery 128 upon closure of a switch 129. Similarly, the projector motor 131 is energized through a thyristor 132 from a power source 133 upon closure of a switch 135.

The projector motor 131 drives the film through a film advance mechanism schematically indicated at 136. A photocell 127 senses the starter marks 98 on the film 16 (see FIG. 2). To this end the photocell is illuminated through such marks by the projector lamp 139 or another source of light. Alternative sensing methods are apparent from the initially mentioned Lancor and Browder applications.

The photocell 137 is connected in series with a potentiometer 140 between terminal 124 and ground. Upon the sensing of a starter mark 98 on the film 16, the photocell lowers its resistance so that a transistor 142 is triggered through a diode 143. Upon such triggering, the transistor 142 acts through a lead 144 to connect the emitter of a unijunction transistor 145 to ground. This fires the transistor 145 and the transistor stages 147 and 148 so that the tape playback drive 150 is connected to the battery 128. The drive 150 rotates a capstan 151 to advance the tape 32 for a playback of the sound accompaniments 83 and 84 by means of a playback head 153, an for a playback of the synchronization signals 86 and sound termination marks 87 by means of a playback head 154.

A playback amplifier 155 and a loudspeaker 156 are connected to the playback head 153 for an aural reproduction of the sound accompaniments. During such aural reproduction, the motion picture frames 22 (see FIG. 2) are projected on a screen (not shown) by a projector lens system 158.

To provide synchronism between the played-back sound accompaniments and the projected motion pictures, the synchronization pulses 86 are picked up by the playback head 154 and amplified by two transistor amplifier stages 160 and 161. The positive-going portions of the amplified synchronization pulses are applied through a capacitor 162 and a diode 163 to a flip-flop circuit 164.

The flip-flop circuit 164 comprises two transistors 166 and 167 and is designed as illustrated so that each pulse passing the diode 163 opens the transistor 166 which, in turn, closes the transistor 167 for the energization of a relay 169 and closure of a relay contact 170. This contact 170 remains closed as long as the transistor 167 is closed.

The transistor 167 is opened and the relay 169 deenergized for an opening of the relay contact 170 in response to the closure of a switch 172 in the projector 122. The switch 172 is connected to the base of the transistor 167 through a diode 174, and is a functional equivalent of the switch 88 of the camera illustrated in FIG. 1. Accordingly, the switch 172 is actuated by a cam 176 which is operated by the projector drive 131 so that the projector switch 172 is pulsed in the same manner as the camera switch 88.

The relay 169 closes its contact 170 in response to each synchronization pulse 86 picked up from the tape 32, and opens its contact 170 in response to each pulse produced by a closing of the projector switch 172. The angular position and configuration of the cam 176 are such that the relay contact 170 is closed during one-half of each image frame and is opened during the remaining half of the image frame if the film 16 advances in synchronism with the tape 32.

The relay contact 170 is connected across a resistor 178 of a phase shift circuit which further includes a resistor 179 connected to the control electrode 180 of the bi-directional thyristor 132, and a capacitor 182 connected between the control electrode 180 and the power terminal 183 of the thyristor 132.

The circuit elements 178, 179 and 1 are dimensioned in a conventional manner so that the projector motor 131 runs at nominal speed if the relay contact 170 is closed during one-half of each frame cycle, and is open during the remaining half of the frame cycle. In a preferred embodiment, the projector motor runs at 1.05 times nominal speed when the relay contact 170 is closed during the entire duration of a frame cycle, and at 0.95 times nominal speed when the relay contact 170 remains open for a full frame cycle.

Accordingly, the projector motor will be energized back into synchronism if the pulses provided by the switch 172 should lag behind, or should lead, the ideal 180° relationship of these pulses to the incidence of the synchronization pulses 86 at the control signal pickup head 154.

The stopping of the tape recorder 123 at the end of a sound sequence is effected in response to the pickup of a sound termination mark 87 by the head 154, and an amplification of this termination mark by the stages 160 and 161.

The amplified sound termination mark is applied through a transformer 190 and a diode 191 to an integrating circuit 192 composed of a capacitor 193 and a resistor 194. The time constant of the integrating circuit 192 is such that the short, spaced synchronization pulses 86 are not able to provide at the output 196 of the integrating circuit a signal sufficient to switch a transistor 197. The longer termination mark 87, on the other hand, is able to switch the transistor 197 through the diode 198.

Since the transistors 142 and 197 are combined in a flip-flop circuit 200, triggering of the transistor 197 to its "on" state switches the transistor 142 to its "off" state, so that the unijunction transistor 145 is switched off through the lead 144. This, in turn, causes the stages 147 and 148 to disconnect the tape recorder motor 150 from the battery 128 so that the tape recorder 123 stops. If desired, the low-inertia drive illustrated in FIG. 1, or the dynamic breaking function disclosed in the initially mentioned Lancor application, may be employed to provide for a stopping of the tape recorder 123 that is as rapid as the stopping of the recorder 14 in the camera 10.

The tape recorder 123 remains at rest until a new starter mark 98 on the film 16 is detected by the photocell 137, whereupon the sound playback cycle just described commences anew.

Further ones of the refinements disclosed in the initially mentioned Lancor, Browder and John applications may be incorporated into the subject equipment as desired or deemed necessary.

I claim:

1. A motion picture camera comprising in combination:
motion picture taking means having a quiescent state, and having an active state for taking motion pictures in the form of motion picture frames;
sound recording means having a quiescent state, and having an active state for recording sound accompaniments for said motion pictures;
actuating means operatively associated with said motion picture taking means and said sound recording means for selectively actuating said motion picture taking means and said sound recording means to their active states, and for selectively initiating a release of said motion picture taking means and said sound recording means to their quiescent states; and
means operatively associated with said actuating means for deferring a release of said motion picture taking means and said sound recording means to their quiescent states pending completion of the taking of a motion picture frame by said motion picture taking means.

2. A motion picture camera as claimed in claim 1, wherein:
said actuating means have a first position in which said motion picture taking means and said sound recording means are actuated in their active states, and a second position in which said motion picture taking means and said sound recording means are released to their quiescent states; and
said deferring means are coupled to said actuating means for deferring a return of said actuating means from said first to said second position until completion of the taking of a motion picture frame by said motion picture taking means.

3. A motion picture camera as claimed in claim 2, wherein:
said deferring means include cam means coupled between said motion picture taking means and said actuating means for retaining said actuating means in said first position pending completion of the taking of a motion picture frame by said motion picture taking means.

4. A motion picture camera as claimed in claim 2, wherein:
said sound recording means include means for advancing sound recording tape, and means coupled to said actuating means for activating said tape advancing means upon movement of said actuating means to said first position, and for deactivating said tape advancing means upon movement of said actuating means to said second position.

5. A motion picture camera as claimed in claim 4, wherein:
said tape advancing means include a tape advancing capstan; and
said activating and deactivating means include a roller coupled to said actuating means for selectively moving recording tape into engagement with said tape advancing capstan.

6. A motion picture camera comprising in combination:
a housing;
motion picture taking means mounted in said housing and having a quiescent state, and an active state for taking motion pictures in said housing said motion picture taking means including a first selectively energizable electric drive motor;
sound recording means mounted in said housing and having a quiescent state, and an active state for recording, in said housing, sound accompaniments for said motion pictures said sound recording means including a second selectively energizable electric drive motor mechanically isolated from said first electric drive motor;
a member movably mounted in said housing to be manually actuable from outside of said housing; and
a mechanism mounted in said housing and operatively associated with said member and with said motion picture taking means and sound recording means for jointly actuating said motion picture taking means and said sound recording means to their active states in response to manual actuation of said member, and for jointly releasing said motion picture taking means and said sound recording means to their quiescent states in response to a release of said member.

7. A motion picture camera as claimed in claim 6, wherein:
said sound recording means include means for advancing sound recording tape, and means coupled to said mechanism for activating said tape advancing means in response to manual actuation of said member.

8. A motion picture camera as claimed in claim 6, wherein:
said sound recording means include a capstan for advancing sound recording tape, selectively actuable means for driving said capstan in said quiescent state and in said active state of said sound recording means, and movable roller means coupled to said mechanism and operatively associated with said capstan for selectively moving sound recording tape into engagement with said capstan in response to actuation of said manually actuable member.

9. A motion picture camera as claimed in claim 6, wherein:
said motion picture taking means are constructed to take said motion pictures in the form of motion picture frames; and
said mechanism includes means for deferring a release of said motion picture taking means and said sound recording means to their quiescent states pending completion of the taking of a motion picture frame the taking of which was commenced during a release of said manually actuable member.

10. A motion picture camera as claimed in claim 10, wherein:
said motion picture taking means include an electric drive motor and contact means coupled to said mechanism and connected to said drive motor for causing energization of said drive motor in response to actuation of said manually actuable member; and said deferring means include cam means actuated by said drive motor and coupled to said contact means for maintaining said drive motor energized pending completion of the taking of said motion picture frame.

11. A motion picture camera as claimed in claim 6, including means operatively associated with said mechanism for exposing in response to actuation of said manually actuable member a predetermined portion of a motion picture film employed in said motion picture taking means.

12. A motion picture camera as claimed in claim 6, including means actuated by said motion picture taking means and operatively associated with said sound recording means for recording synchronization information for said sound accompaniments.

13. A motion picture camera comprising in combination:
a housing;
motion picture taking means mounted in said housing and having a quiescent state, and an active state for taking motion picture in said housing;
sound recording means mounted in said housing and having a quiescent state, and an active state for recording, in said housing, sound accompaniments for said motion pictures, said sound recording means including a capstan for advancing sound recording tape, selectively actuable means for driving said capstan in said quiescent state and in said active state of said sound recording means, and movable roller means coupled to said mechanism and operatively associated with said capstan for selectively moving sound recording tape into engagement with said capstan in response to actuation of said manually actuable member;
a member movably mounted in said housing to be manually actuable from outside of said housing; and
a mechanism mounted in said housing and operatively associated with said member and with said motion picture taking means and sound recording means for jointly actuating said motion picture taking means and said sound recording means to their active states in response to manual actuation of said member, and for jointly releasing said motion picture taking means and said sound recording means to their quiescent states in response to a release of said member.

14. A motion picture camera comprising in combination:
a housing;
motion picture taking means mounted in said housing and having a quiescent state, and an active state for taking motion pictures in said housing, said motion picture taking means being constructed to take said motion pictures in the form of motion picture frames;
sound recording means mounted in said housing and having a quiescent state, and an active state for recording, in said housing, sound accompaniments for said motion pictures;
a member movably mounted in said housing to be manually actuable from outside of said housing; and
a mechanism mounted in said housing and operatively associated with said member and with said motion picture taking means and sound recording means for jointly actuating said motion picture taking means and said sound recording means to their active states in response to manual actuation of said member, and for jointly releasing said motion picture taking means and said sound recording means to their quiescent states in response to a release of said member, said mechanism including means for deferring a release of said motion picture taking means and said sound recording means to their quiescent states pending completion of the taking of a motion picture frame the taking of which was commenced during a release of said manually actuable member.

15. A motion picture camera as claimed in claim 14, wherein:
said motion picture taking means include an electric drive motor and contact means coupled to said mechanism and connected to said drive motor for causing energization of said drive motor in response to actuation of said manually actuable member; and
said deferring means include cam means actuated by said drive motor and coupled to said contact means for maintaining said drive motor energized pending completion of the taking of said motion picture frame.

* * * * *